United States Patent [19]

Bodin

[11] Patent Number: 6,122,512
[45] Date of Patent: Sep. 19, 2000

[54] METHOD AND APPARATUS FOR MOBILE STATION GEOGRAPHICAL LOCATION DETERMINATION

[75] Inventor: Stig Roland Bodin, Spånga, Sweden

[73] Assignee: Telefonaktiebolaget LM Ericsson (publ), Stockholm, Sweden

[21] Appl. No.: 08/940,840

[22] Filed: Sep. 30, 1997

Related U.S. Application Data

[60] Provisional application No. 60/028,345, Oct. 15, 1996.

[30] Foreign Application Priority Data

Sep. 30, 1996 [SE] Sweden ............................ 9603561

[51] Int. Cl.[7] .................. H04Q 7/20; H04Q 7/30
[52] U.S. Cl. .................. 455/440; 455/456; 455/436
[58] Field of Search ........................... 455/440, 456, 455/560, 561, 524, 525, 436, 437, 438, 439

[56] References Cited

U.S. PATENT DOCUMENTS

| | | | |
|---|---|---|---|
| 5,394,158 | 2/1995 | Chia ................................ | 455/440 |
| 5,513,246 | 4/1996 | Jonsson et al. ................. | 455/456 |
| 5,613,205 | 3/1997 | Dufour ............................. | 455/33.2 |
| 5,657,487 | 8/1997 | Doner .............................. | 455/456 |
| 5,915,221 | 6/1999 | Sawyer et al. ................. | 455/437 |
| 5,917,811 | 6/1999 | Weaver, Jr. et al. ........... | 370/332 |

FOREIGN PATENT DOCUMENTS

| | | |
|---|---|---|
| 0 631 453 A2 | 6/1994 | European Pat. Off. . |
| WO 92/05672 | 4/1992 | WIPO . |
| WO 96/25830 | 8/1996 | WIPO . |
| 96/01078 | 9/1996 | WIPO . |

*Primary Examiner*—William G. Trost
*Assistant Examiner*—Erika A. Gary
*Attorney, Agent, or Firm*—Jenkens & Gilchrist, P.C.

[57] ABSTRACT

In a cellular mobile telecommunication system, particularly a Global System for Mobile Communications (GSM) system, a method and apparatus determine the geographical position of a mobile station. The distance between the mobile station and a radio base station is estimated from the propagation delay. The propagation delay is determined according to the present method when the mobile station sends access bursts to the base station, which measures the access delay of the arrived bursts in the same way as an ordinary handover. However, no confirmation of received access bursts is sent from the base station to the mobile station and therefore the handover attempt is terminated. The connection between the mobile station and the previous base station is re-established. The measured access delay is proportional to the propagation delay and thereby also to the distance to the mobile station. The mobile position can be determined with good accuracy if values from at least three base stations are obtained, although with less accuracy if only two values are obtained. Also, an access delay measured by earlier known methods can be used together with measurements achieved with the present method to determine the mobile position.

18 Claims, 7 Drawing Sheets

METHOD AND APPARATUS FOR MOBILE STATION GEOGRAPHICAL LOCATION DETERMINATION

CROSS-REFERENCE TO RELATED APPLICATION

This Application for Patent claims the benefit of priority from, and hereby incorporates by reference the disclosure of, co-pending U.S. Provisional Application for Patent Ser. No. 60/028,345, filed Oct. 15, 1996.

BACKGROUND OF THE INVENTION

1. Technical Field of the Invention

The present invention relates to mobile communications systems and, in particular, to determining the geographical position of a mobile station in, for example, a TDMA-type mobile telephony system.

2. Description of Related Art

Several methods for determining the position of a mobile station in a cellular land-based mobile radio system are known in the art.

PCT 9G/00274 describes one such method for determining the position of a mobile station. The position of the mobile station is determined with the aid of triangulation after measuring and recording propagation delays and signal strengths between the mobile station and neighboring base stations. A traffic connection is first established between a mobile station and first base station, and then the signal strength and the propagation delay are measured in respect to this connection. In order to be able to measure the propagation delay and the signal strength between the mobile station and a second base station, it is necessary to handover the radio connection so as to maintain the connection via the second base station. When measuring signal strength and propagation delay in respect to further base stations, it is necessary to effect a new handover.

Upon completion of the measurement run, the radio connection is again switched to the original base station. It will be noted that a complete handover takes place with each base station, i.e., the voice/data traffic, as well as the control information, is transmitted over the connection between the mobile station and the new base station. This means that the connection will be setup over a non-optimal base station. The radio connection is setup over channels which are not intended for use in the cell in which the mobile station is located, a circumstance which is liable to having a disturbing effect on other traffic in the mobile radio system and also to impair the quality of the established connection.

SE-B-466 376 describes another method for determining the position of a mobile station in a Global System for Mobile Communications (GSM)-type mobile telephone system. In this case, it is also possible to determine the position of the mobile station even when the system base stations are not synchronized. A base station measures the time delay upon the arrival of an access signal sent by the mobile station in relation to the expected time arrival of the signal if the mobile station were located in the same place as the base station. The access signal is sent by the mobile station over the random access channel (RACH) common to a radio base station. This channel is used when the mobile station is in an idle mode. The measuring procedure is repeated at several base stations, where three measurement values are required for determining the position of the mobile station.

The mobile station designates the base stations to which an access signal is sent. According to one embodiment, the time delays measured in the base stations are sent back to the mobile station in the form of so-called time-alignment values (TA). The mobile station receives a TA from each designated base station and forwards the TA value together with the identity of the base station to a localizing unit, in which the position of the mobile station is determined. Unfortunately, with this technique, it is necessary to modify the mobile station in order to transmit these data. It is also necessary to modify the base station in order to be able to designate several base stations to which access is initiated. In a further embodiment, the base stations send the measured time delays to the localizing unit.

SE 96005772, a Swedish Patent Application, also describes position determining. It describes how the position of a mobile station in a TDMA-type mobile radio system can be determined by measuring the propagation delay between a mobile station and at least three radio base stations. The mobile station measures the difference in arrival times between signal bursts transmitted from the various base stations. One problem is that the radio base stations are not synchronized time-wise, meaning that their internal signal burst transmission schedules are displaced in time. In order for the propagation delay to be measured, it is necessary to know the time at which a signal is transmitted and the time at which this signal is received by the mobile station. In order to establish the time of transmission, there is used a reference mobile whose position is known; consequently, the propagation delay of signals from neighboring base stations is also known.

The reference mobile also measures the time difference between signal bursts from different base stations. The time differences measured in the reference mobile and in the mobile whose position is to be determined are sent to an evaluating node, which calculates the time displacements between the base stations. Subsequent calculation of the propagation delays between the radio base stations and the mobile, and therefore calculation of the position of the mobile, can be effected either at the evaluation node or at the mobile station.

A non-exhaustive list of objects of the invention follows:

An object of the invention is to enable the position of a mobile station in a mobile radio system to be determined;

Another object of the invention is to enable the position of a mobile station in a mobile radio system to be determined with non-synchronized radio base stations;

Yet another object of the invention is to enable the position of a mobile station in a mobile radio system to be determined without requiring modification to the mobile station;

Still another object of the invention is to enable the position of a mobile station in a mobile radio system to be determined using generally existing functions in the land-based part of the system;

Yet still another object of the invention is to enable the position of a mobile station in a mobile radio system to be determined while limiting the additional radio frequency interference with respect to its own radio traffic and neighboring radio traffic caused by the position determining process; and Still yet another object of the invention is to enable the position of a mobile station in a mobile radio system to be determined with non-synchronized radio base stations without requiring modification to the mobile station using generally existing functions in the land-based part of the system while limiting the additional radio frequency interference with respect to its own radio traffic and neighboring radio traffic caused by the position determining process.

SUMMARY OF THE INVENTION

The present invention addresses problems concerned with how the geographic position of a mobile station can be determined in, for example, a GSM-type mobile telephone system.

A problem is that the measurement of the radio connection that is necessary to determine position of a mobile violates the system frequency plan and therefore increases radio frequency interference in the system. Another problem with known methods is that the quality of an established speech connection is impaired by the signaling necessary to determine the position of a mobile. Still another problem resides in the high costs incurred when it is necessary for the user to replace its mobile station with a new modified station in order to avail itself of the position finding function.

A further problem is one of being able to determine the position of a mobile station in an existing mobile telephone system and, at the same time, be able to avoid synchronization between base stations with regard to signal burst transmissions. Yet a further problem is one of achieving a high degree of precision in determining the position of a mobile station. These and other problems are addressed and alleviated by the invention.

According to the invention, if no traffic connection has been initially established with the mobile station whose position is to be determined, then such a traffic connection is set up. In accordance with one method of the invention, the mobile station is ordered to perform a handover to a new base station. The mobile station therefore sends access signals to the new base station. The new base station determines the time delay upon the arrival of the access signal as with a typical handover. The time delay is a measurement of the propagation delay between the mobile station and the new base station. Distinct from normal handover, all signaling from the new base station to the mobile station is inhibited, and the mobile station thus receives no confirmation regarding transmitted access signals. The mobile station then reestablishes the connection with the old base station in accordance with standard unsuccessful handover procedures. The described measuring procedure is then repeated at one or more base stations. The result of the measuring procedure is used to determine the position of the mobile station.

In a preferred embodiment, a service node obtains access to those time delays that have been measured at at least three base stations. The service node is able to determine the position of the mobile station with knowledge of the positions of the base stations along with knowledge of the aforesaid time delays on the basis of earlier known computing methods. If access is available to solely two time delays, it is still possible to determine the position of the mobile station although with a certain degree of uncertainty. When determining the position of a mobile, it is also possible to utilize a time delay that has been obtained with earlier known measuring methods, e.g., in the base station that serves the mobile station during a connection setup.

Subsequent to establishing a traffic connection with the mobile station, the base station controller is given access by the mobile station to a list of received signal strengths. The received signal strengths are from base stations that neighbor the connected radio base station. From this list, those base stations that are to make measurements for determining the position of the mobile station are chosen by the land-based part of the system. The mobile station records a time reference for each of the base stations included on the list. The mobile station measures the time reference by listening on the synchronization channel (SCH) and frequency correction channel (FCCH) belonging to each base station.

The recorded time reference is used when the mobile station is ordered to effect handover to a new base station chosen from the list compiled by the mobile station. The time reference is used to send the access signal to the new base station at the correct time. Despite this, the access signal will arrive at the new base station delayed in relation to the correct time position, as a result of wave propagation delay. The new base station records this time delay in relation to the correct time position. The recorded time delay corresponds to the wave propagation time of a signal reciprocating between the new base station and the mobile station.

A method according to the invention constitutes an improvement of earlier known methods where complete handover of a radio connection is made to enable the position of a mobile to be determined.

When the inventive method is applied, radio traffic that is in violation of current frequency schedules, the violation being necessary for determining the position of a mobile, is restricted to those access signals sent by the mobile station to the base station chosen to determine the position of the mobile. An ongoing connection suffers less quality impairment when the mobile station interrupts an attempt to handover to a new, radio-wise-poorer base station as compared to when the handover is continued and the traffic connection is established with the new base station. One reason is that the radio connection is quickly re-established over the earlier base station when handover is interrupted.

Another advantage afforded by the present invention is that the positions of existing non-modified mobile stations can be determined. The position determining function utilizes existing handover functions. Only moderate changes in the land-based part of the system are required to implement the inventive position determining method.

Another advantage afforded by the invention is that the time delays measured in the base stations can be used without their needing to be rounded-up, which enables the position of the mobile station to be determined with great precision.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, circuit components, techniques, etc. in order to provide a thorough understanding of the invention. However it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

A preferred embodiment of the present invention and its advantages are best understood by referring to FIGS. 1–8 of the drawings, like numerals being used for like and corresponding parts of the various drawings.

Prior to describing the invention, it is thought appropriate to explain a part of the construction of the GSM system while focussing on the functions on which the invention is based.

Figure 1:
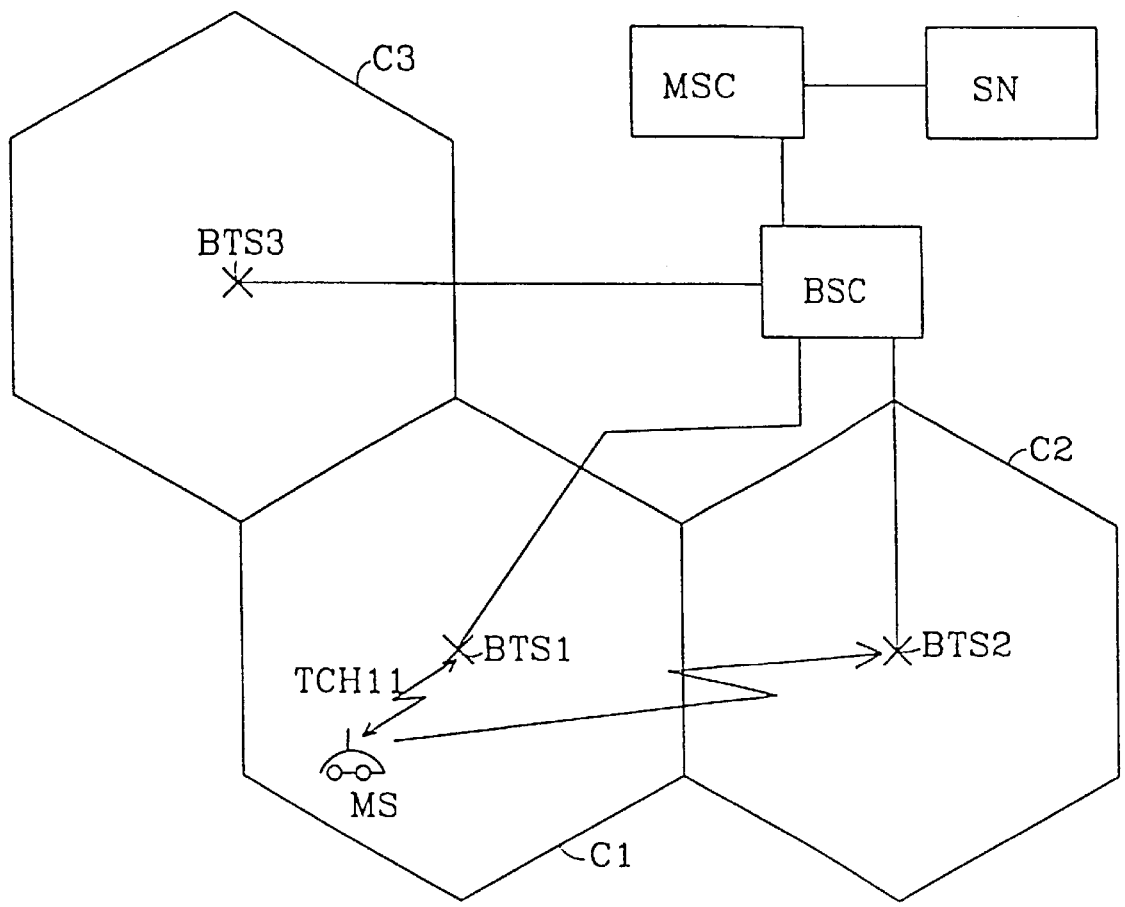
FIG. 1 illustrates a principle diagram of a mobile telephone system in which the invention is applicable.

A GSM-type mobile radio system is illustrated schematically in FIG. 1. In the illustrated case, the system includes three base transceiver stations (BTS) BTS1, BTS2, and BTS3. The base stations are connected to a common base station controller BSC. The number of base transceiver stations connected to the base station controller BSC may be greater than the number shown in FIG. 1.

Each of the base transceiver stations BTS1–BTS3 serves a radio cell, where the station BTS1 serves the cell C1, the station BTS2 serves the cell C2, and so on. The base station controller BSC is connected to a mobile telephone switching center MSC. Further base station controllers may be connected to the switching center MSC, although this has not been shown in FIG. 1.

A mobile station MS is assumed to be located in the cell C1 and therefore served by the base transceiver station BTS1 over a given radio channel in accordance with the time division multiple access (TDMA) concept (TDMA, carrier frequency, time slot, see the following text). A mobile localizing register [e.g., home location register (HLR) or visiting location register (VLR)] (not pictured) and possibly a service node SN are also connected to the mobile switching center MSC, although the service node may be located outside the public mobile radio network. In this case, the service node SN serves the mobile radio system with certain services. These services are not explained in detail here to avoid unnecessarily obscuring the invention. The service node SN can, however, be used in conjunction with carrying out the invention.

The physical radio interface is divided in accordance with the TDMA structure, meaning that a radio carrier wave is divided into time slots. A frame is comprised of eight sequential time slots. Subsequent to setting-up a connection, a user has a physical channel, consisting of one time slot per frame, reserved for each uplink and downlink.

Figure 2:
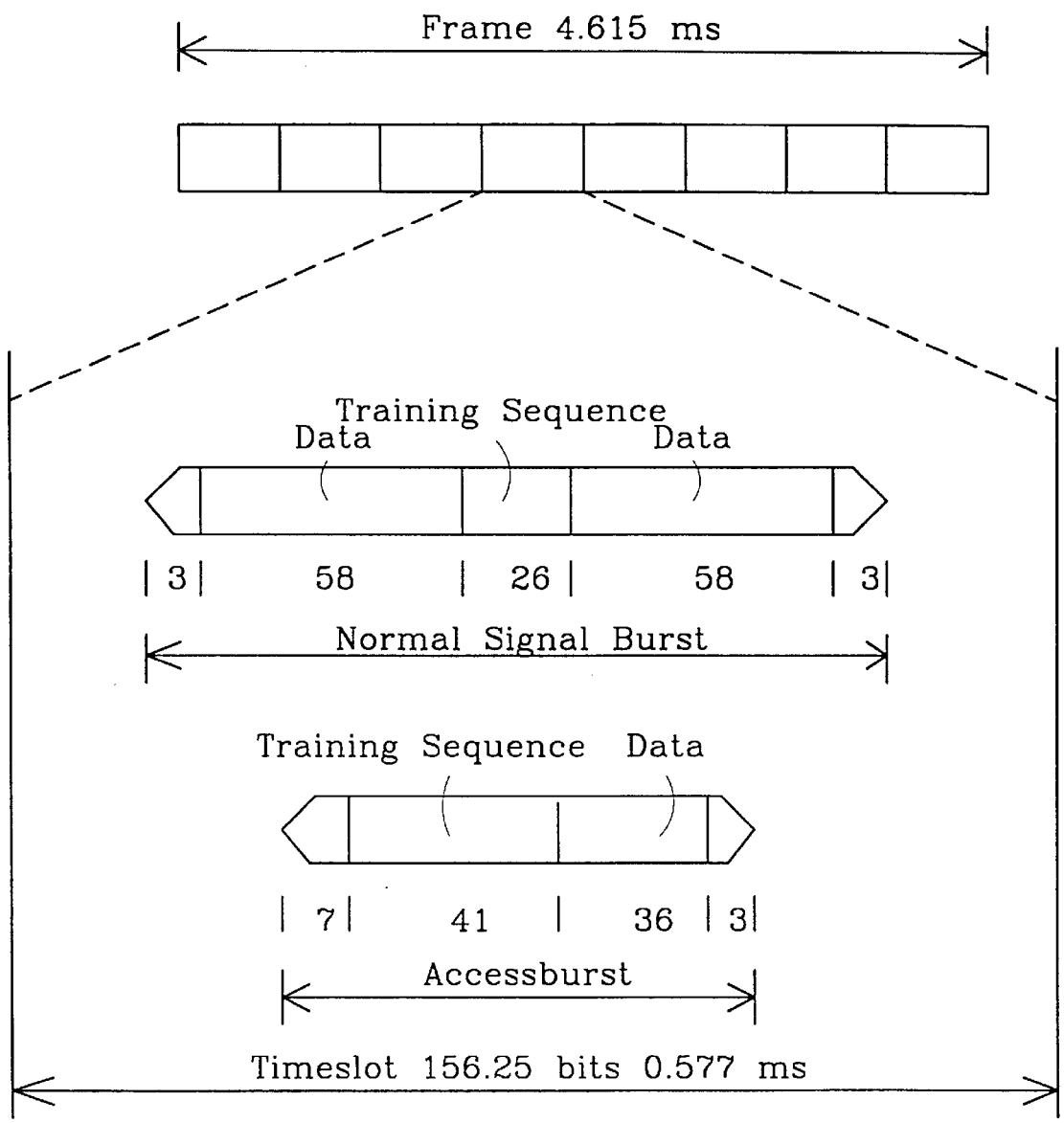
FIG. 2 illustrates, by way of example, a typical TDMA division of a carrier wave in time slots and signal bursts along with their placement within the GSM system.

FIG. 2 illustrates a TDMA frame containing time slots, a normal signal burst and an access burst. The length of a frame, time slot, normal signal burst, and access burst is shown in FIG. 2. Also shown is the use of the various bits in the normal signal burst and in the access burst. In the case of an uplink channel, time slot "n" is time-shifted three slots after time slot "n" downlink, as observed at the base station. A signal burst from a mobile shall be received in a base station within the reserved time slot. As shown in FIG. 2, a time slot is only 8.25 bit periods, i.e., a 30 µs duration, longer than a normal signal burst. Signal bursts from different mobile stations using the same frame must therefore be received at the base station with great temporal accuracy, so as not to interfere with one another.

Logic channels are transmitted on the aforedescribed physical channels. A connected mobile station obtains its own dedicated control channels (DCCH). The mobile station MS shown in FIG. 1 has a traffic connection setup on a traffic channel TCH11, having associated dedicated control channels (DCCHs), over a serving base transceiver station BTS1. The mobile station MS continuously monitors the frequencies on which the broadcast control channels (BCCHs) transmit to neighboring base stations. In FIG. 1, references BTS2 and BTS3 identify stations that neighbor on the base station BTS1. The mobile station measures the signal strength on the frequency on which BCCH transmits for each neighboring station. The mobile station MS also listens to the BS-synchronization channel (SCH) of those base stations which are the strongest, i.e., base stations whose signal levels exceed the level of ambient noise, in order to identify the stations with the strongest received signals. The identified neighboring base stations are included in a list in the mobile station. The mobile station informs the land-based part of the system of the signal strengths of the base stations recorded on the list as well as their identities up to two times per second. The mobile also records a time reference t1 for each base station that is included on the list by listening to the base station synchronization channel (SCH). The time reference t1 indicates the frame switching time at the base station.

The mobile station informs the base station controller BSC in FIG. 1 of the signal strengths and base station identities of the base stations that are included in the aforedescribed list. The base station controller may decide that the radio connection established with the mobile station MS shall take place over the base station BTS2 instead of the base station BTS1, i.e., the connection shall be handed over to the base station BTS2. The signaling sequences that are exchanged in a known manner between the mobile station MS, the base transceiver stations BTS1 and BTS2, and the base station controller BSC with handover are shown in FIG. 6.

Figure 6:
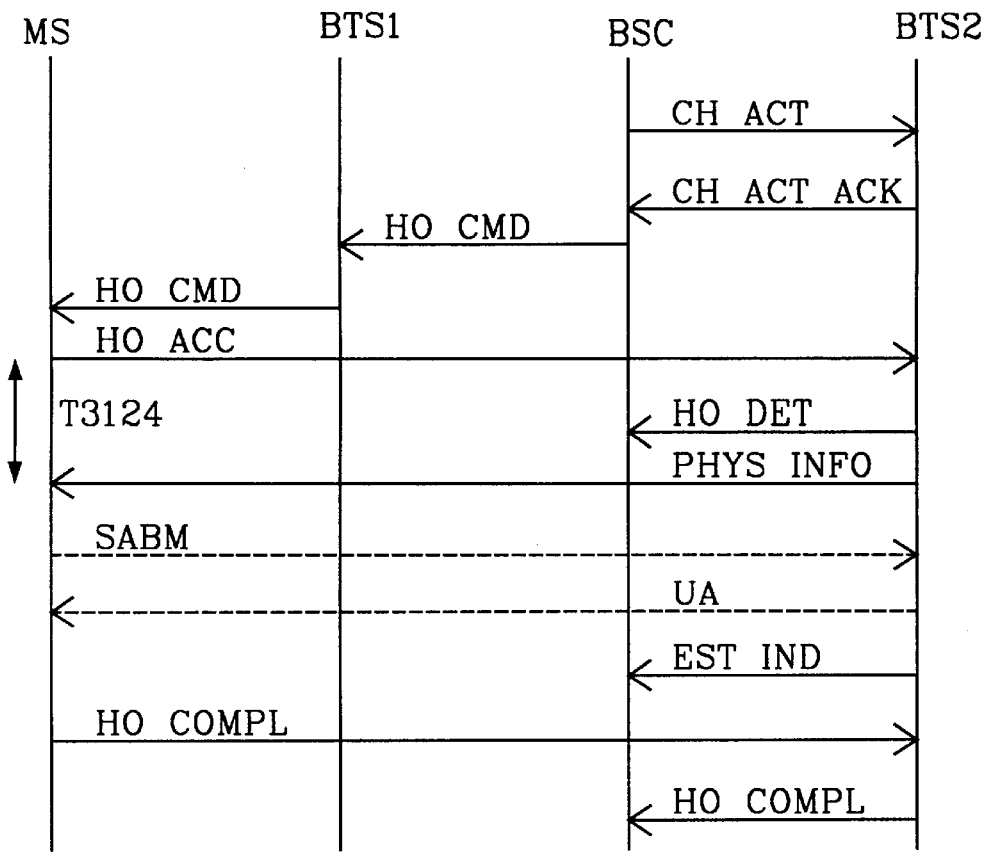
FIG. 6 illustrates a known handover signaling sequence schedule.

Continuing with FIG. 6, the base station controller BSC orders the base station BTS2 to activate a traffic channel with associated control channels for establishing a traffic connection (Channel Activation message). The message includes information as to why the traffic connection is established, in this case handover between non-synchronous radio base stations. The mobile station MS is then ordered to handover to the channels established at the base station BTS2 (Handover Command). The message includes control data (HO reference value).

The mobile station then sends handover access message signals to one of the allocated dedicated control channels (DCCH) for communication with the base transceiver station BTS2. A clock, T3124, is activated in the mobile station MS when transmitting the first access signal. In order to transmit these access signals correctly in accordance with the time schedule of the base station BTS2, the mobile station MS uses the earlier measured time reference t1 and makes corrections with regard to the time slot used by the channel DCCH, although without correcting for any possible time delay.

When transmitting the access signal, the mobile station MS has no knowledge of the propagation delay and is unable to compensate for the time taken for the signal to reach the base station BTS2. The access signal is therefore received at the base station BTS2 delayed in relation to the internal signal burst arrival schedule of the base station BTS2. This time delay t2 is measured and recorded in the base station BTS2. The recorded time delay corresponds to the wave propagation time of a signal that reciprocates between the base station BTS2 and the mobile station.

If the access signal received in the base station BTS2 contains correct control data, the base station BTS2 proceeds with the handover by sending a response, PHYS INFO, to the mobile station MS. It also sends to the base station controller a signal informing that handover has been detected, this signal containing the recorded time delay. The remaining handover procedure is of no interest to the invention.

The measured time delay t2 in the base station is divided by two and rounded-up to a bit period, this value being designated "Timing Advance" (TA) in the GSM specification. When the base transceiver station BTS2 answers the mobile station MS on the access signals, the mobile station MS becomes aware of TA and, in continued signaling, is able to make a time correction also with respect to the propagation delay. The clock T3124 is stopped when the mobile station MS has received confirmation of transmitted access signals from the base station BTS2.

The aforedescribed procedure applies generally to GSM-type mobile systems. The manner in which the position of a mobile station is determined in accordance with the invention will now be described.

If the mobile station whose position shall be determined does not already have a traffic connection established, such a connection is now established. The connected mobile station MS in FIG. 1 repeatedly measures and records the signal strengths of the carrier waves, over which neighboring base stations transmit respective broadcast control channels (BCHs), in the same way as that described above with respect to all connected mobile stations MS. BTS2 is one of these neighboring base transceiver stations. This stage is represented by the first block B1 in the flow sheet of FIG. 3.

The mobile station MS also decodes the synchronization channel SCH of those base stations from which the mobile station measures the strongest signal strengths, and also records a time reference for respective neighboring base stations. The time reference recorded in respect of base station BTS2 is designated t1. This time reference recordation procedure is also carried out continuously, although less frequently than the rate at which signal strength is measured, but in the same way as that described above with respect to other connected mobile stations MS. This procedure is represented by the second block B2 in FIG. 3.

The calculated mean value power levels of the signal strengths measured by the mobile station in respect of those base stations included in the list are reported to the base station controller up to two times per second. This procedure also applies generally to all connected mobile stations MS in the GSM system. The procedure is symbolized by the third block B3 in FIG. 3.

An important feature specific to the invention occurs when the base station BTS2 receives from the base station controller BSC a new type of command concerning mobile position measuring. This command involves the base station BTS2 activating channels for receiving access signals from the mobile station MS. This stage is represented by the fourth block B4 in FIG. 3.

The base station controller BSC then sends to the mobile station, via the base station BTS1, a normal handover command ordering the mobile station to handover to the base station BTS2. The command includes both control data and information as to which channel shall be used. This procedure is represented by the fifth block BS in FIG. 3.

The mobile station MS proceeds in the aforedescribed manner when effecting handover. The mobile station MS sends a number of access bursts over the dedicated control channel (DCCH). The time of transmission of each access burst is determined by the measured time reference t1 for the base station BTS2 and the command number in the frame for the time slot of the dedicated channel. The time delay t2 of the access signal is measured at the base station BTS2 in relation to the expected arrival time at the base station BTS2 if the mobile station were located at the same location as the base station BTS2. The time delay is measured in the same way as it would be with handover, but it differs from a complete handover to the base station BTS2 because although BTS2 records t2, it also inhibits all response to the mobile station MS. The mobile station MS thus receives no response to the access signals. This stage is represented by block B7 in FIG. 3.

Figure 7:
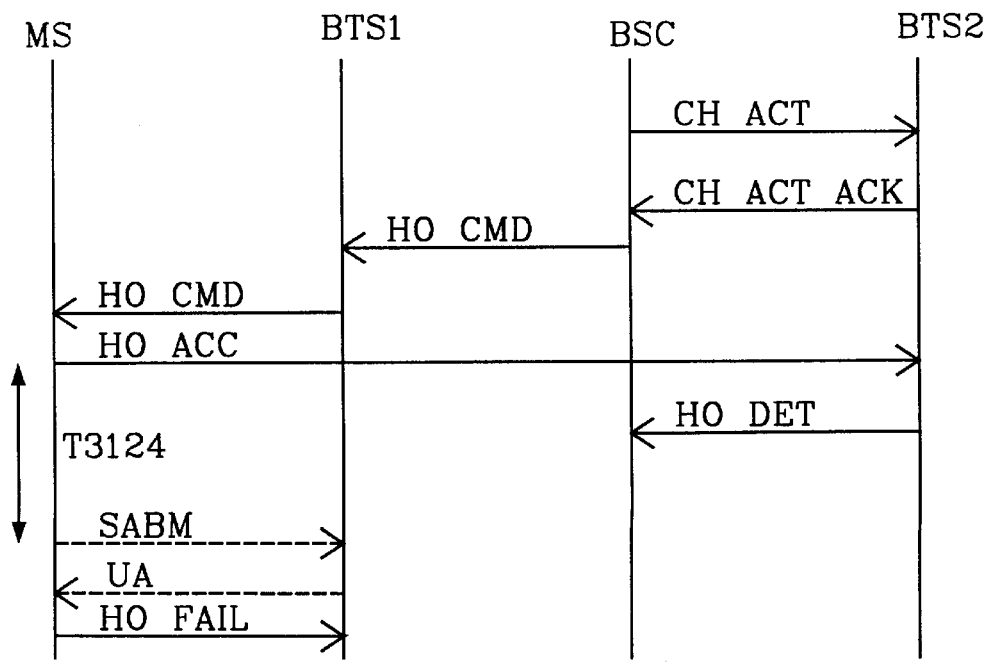
FIG. 7 illustrates a signaling sequence schedule for determining the position of a mobile in accordance with the invention.

A clock T3124 is activated in the mobile station when sending the first access burst, see FIG. 7. When the time set on this clock has expired in the absence of any confirmation from the base station BTS2, the mobile station MS stops the transmission of access bursts to the base station BTS2. The mobile station MS then reestablishes the earlier connection with the base transceiver station BTS1 in accordance with standard unsuccessful handover procedures. This stage is represented by block B6 in FIG. 3.

The measured time delay t2 is sent from the base station BTS2 to a service node, possibly via other nodes, for measurement data processing as well as for the calculations for determining the position of the mobile. This stage is represented by block B8 in FIG. 3.

The procedure according to block B1 to B6 is repeated, but the measuring procedure is executed with a base transceiver station other than BTS2, i.e., the same type of access is now made to another base transceiver section, e.g., to BTS3. FIG. 4 illustrates repetition of the FIG. 3 procedure in several base stations, whereafter the position of the mobile station is determined on the basis of the time delays tn measured at the base stations.

In the first block Al in FIG. 4, a count-up number n is set to a start value n=2. All of the stages B1–B8 described in FIG. 3 with reference to the first base station BTS2 are executed in block A2. In block A3, a check is then made to ascertain that a time delay t2 has been obtained by measurement at BTS2. If such a time delay t2 has been obtained (a "Yes" branch from decision block A3), a decision is then made as to whether measuring shall be repeated in a further base station; see decision block A4. If it is decided in decision block A4 to repeat the measuring process (a "Yes" response branching) the count-up number is stepped-up one increment, n=n+1 in block A5, whereafter the procedure according to blocks A2 and A3 is repeated for another base station BTS. Subsequently, another time delay is obtained.

The question is then again raised in decision block A4 as to whether or not measuring shall be repeated in a further base station. With each decision to repeat measuring in a further base station, it is first checked that there is access to such a further base station that can participate in determining the position of the mobile station. If such a base station is determined to exist, it is because the base station is recorded on the earlier described list sent to the base station controller by the mobile station MS. If access to time delays is available from only one or two base stations, it is decided that the measuring procedure shall be repeated if there is found a further base station that can participate in the measuring process.

On the other hand, if time delays have been obtained from at least three base stations, the question of whether or not a further measuring value will increase the accuracy with which the position of the mobile station can be determined shall be taken into account when deciding whether or not the measuring process shall be repeated. Subsequent to the question of further measuring being answered in the negative (a "No" branch taken at decision block A4), the position of the mobile station is calculated with the aid of the time delay or time delays obtained from the base stations; see block A6. One or more time delays obtained from other base stations by earlier known measuring methods can also be used in determining the position of the mobile.

In order to enable the position to be determined with a high degree of reliability, preferably at least three time delays, measured at different base stations will be available to the service node. The mobile position may also be determined with only two time delays, although to a less reliable extent.

Figure 3:
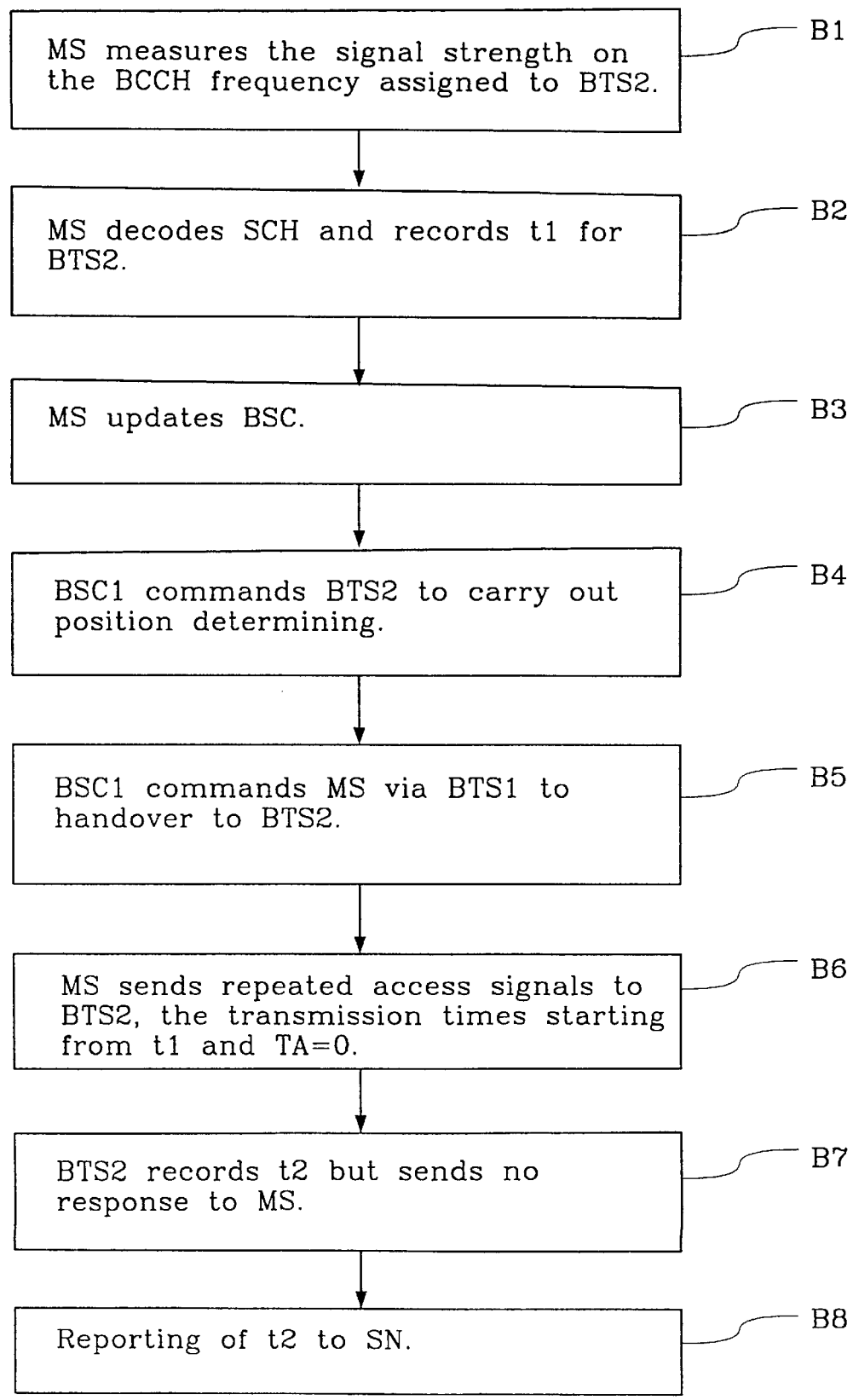
FIGS. 3 and 4 are flow charts illustrating the inventive method.
Figure 4:
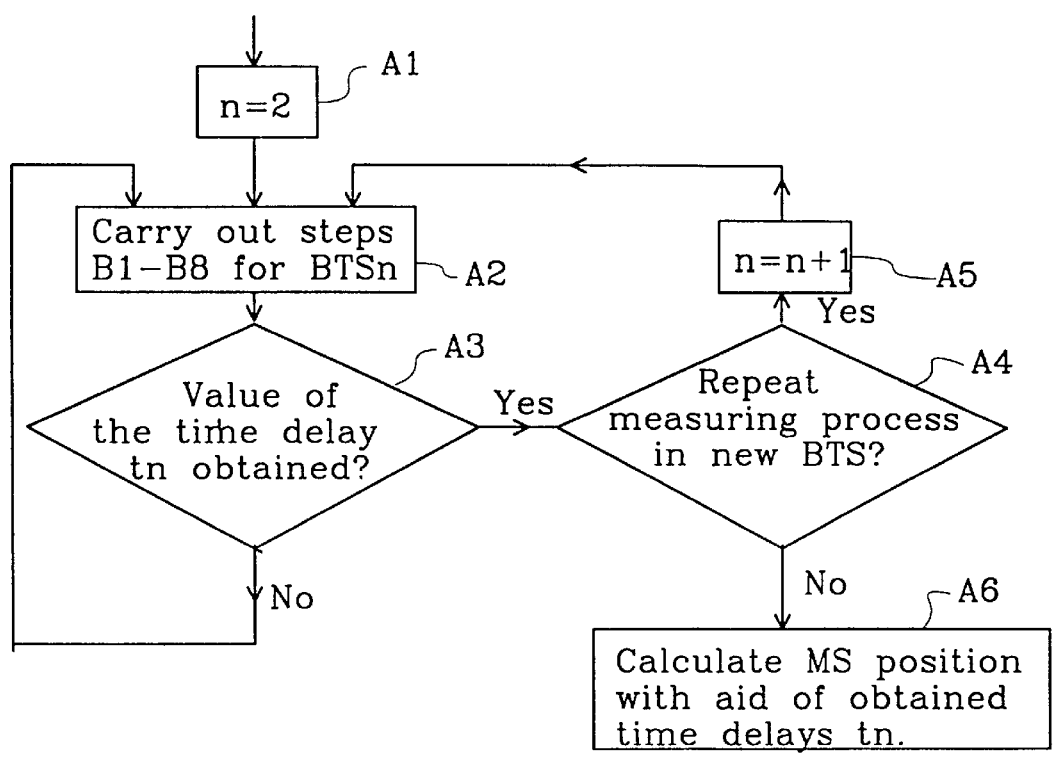

The new order received by the base station BTS2 with regard to determining the position of the mobile, block B4 in FIG. 3, may be comprised of a modified order concerning channel activation. This order is sent by the base station controller BSC to the base station BTS2. The current order includes information as to why a new channel shall be set up, e.g., handover of a connection between non-synchronized base stations.

Figure 5:
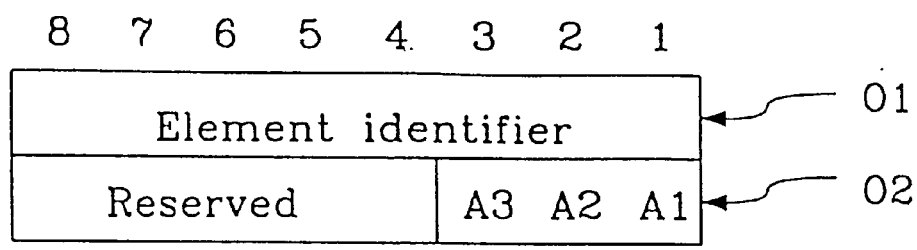
FIG. 5 illustrates a format for information concerning the reason for channel activity as it relates to the invention.

FIG. 5 illustrates a standard format included in the command channel activation for disclosing the reason for the command (GSM 08.58, version 5.0.0., 8.4.1, and 9.3.3). The format includes two fields 01 and 02, each of eight bits, for indicating the reason for channel activation. Field 02 includes three bits A1, A2, and A3, which are used to indicate cause. The three bits can assume eight symbols, of which five are reserved for specific purposes in accordance with GSM 08.58, version 5.0.0. The remaining three symbols are reserved for future use; one of the symbols may be used to indicate the channel to be activated for position determination.

FIG. 7 illustrates a signaling sequence schedule as it may appear if the channel activation order or command is modified in accordance with one embodiment of the invention, as explained above. The sequence schedule is initially similar to that for handover procedure, with the exception that the channel activation command (CH ACT) has been modified. When in receipt of the access signal (HO ACC) from the mobile station MS, the base station BTS2 sends no signal in return, although the base transceiver station nevertheless sends to the base station controller the message that handover has been detected (HO DET), this message including the time delay t2 registered in the base station BTS2. The time delay t2 is forwarded from the base station controller BSC to the service node SN. Transmission of t2 from the base station BTS2 may, alternatively, be effected on receipt of a new command to this effect. The manner in which the measurement value is forwarded is not an essential aspect of the present invention. It is noted that mobile station MS's reconnection to base transceiver station BTS1 is effected by the SABM, UA, and HO FAIL commands.

The time delays received by the service node SN are corresponded to geographical distances. If the distance of the mobile station MS is known with respect to three base stations whose positions are also known, the service node is able to calculate the position of the mobile station MS by means of the earlier known triangulation method. In order for the triangulation calculation to be effective, the base stations will preferably be positioned geographically so as to form a triangle approximately similar to an isosceles triangle. Because it is not always likely that the base stations are so conveniently located geographically, it is beneficial to include more than three base stations in the measuring procedure. The accuracy-reducing effects of time dispersion and rounding-off of the measuring values are also ameliorated when more than three base stations are included in the measuring procedure.

It is possible that the mobile station is positioned in a location in which there is no access to at least three base stations for determining the position of the mobile. The position of the mobile can nevertheless be determined, although with less accuracy, even when there is access to solely two time delays obtained from two base stations. One time delay obtained from one base station corresponds to a given distance from the base station and this distance can be drawn on a map as a circle on which the mobile station is located. Two time delays from two base stations enable the drawing of two circles. The position of the mobile station corresponds to one of the two points on which these two circles intersect. The position determined is unreliable by virtue of the two intersection points. In many instances, one of the intersection points will be the more probable position of the mobile station. This is the case when, for instance, one intersection point corresponds to a highway whereas the other corresponds to a wooded area.

The serving base station BTS1 always has a current value of the time delay reciprocating between the base station and the mobile station MS. This time delay can also be used, together with time delays measured in accordance with the invention, by the service node SN in determining the position of the mobile station.

It may happen that a complete handover of the radio connection to a new base station is made after initiating the mobile position determining procedure, for radio or traffic reasons. In such a case, the propagation delay measured in the new base station and the propagation delay measured in the previous serving base station may be used by the service node SN with a time delay that has been obtained by the inventive measuring method and apparatus for determining the position of the mobile station.

Figure 8:
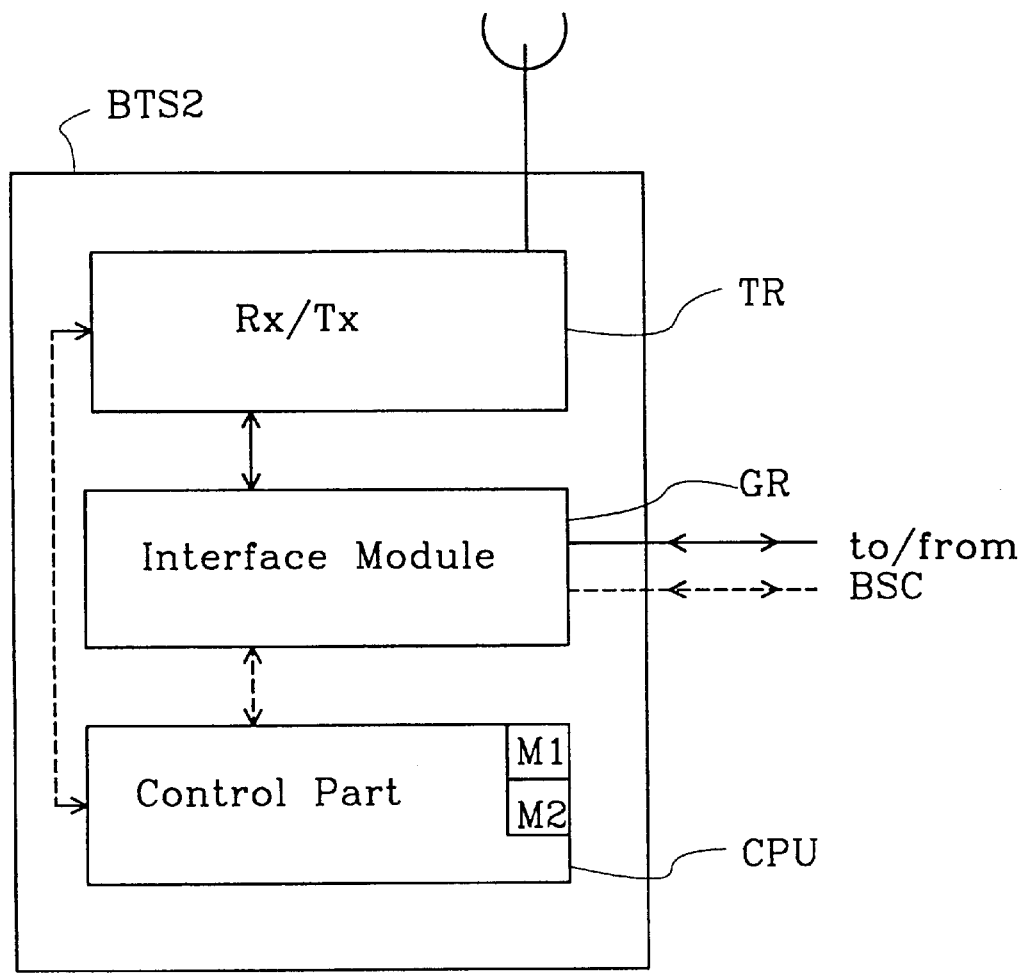
FIG. 8 illustrates a block schematic of units included in the radio base station and the modifications required by the invention.

A base station must be modified in order to interpret a command concerning mobile position determination and then to proceed in the correct manner. FIG. 8 is a block schematic which illustrates the units included in the modified base transceiver station BTS2. The base station is represented by three separate blocks, wherein the first block designated TR is the radio transceiver part of the base station. The second block designated GR is an interface to the base station controller, e.g., the Abis interface in GSM. The third block designated CPU represents a central processor and memory unit capable of handling the base station control functions. The CPU block has data connections with the other two blocks.

The block GR is a mediator of all communications to and from the base station controller BSC. This includes data between BSC and BTS and both speech and data between BSC and the mobile station MS. GR is connected with TR for speech and data passed between BSC and MS.

The central processor CPU includes a decoder unit which decodes the data arriving at BTS from MS and BSC and controls the functions in the other blocks on the basis of the commands received from MS and BSC. The processor CPU also initiates signaling to BSC, the signals passing through GR.

The modified base station BTS2 differs from a typical base station by virtue of the control block having a memory space M1 in which a command relating to position measuring is stored. A similar modification shall be made in base stations BTS3, BTSn, etc. used for mobile position determination. The commands received from the base station controller BSC are compared with the aforesaid stored command in order to ascertain that the incoming command is a position determining command.

It is also necessary for the base station BTS2 to be able to carry out the inventive method. To that end, it is possible to commence with the same procedure as that applied in a typical handover, although in this case it is necessary to ascertain whether or not the stages to be excluded in a position determining procedure shall be followed. This check is carried out with the aid of one or more flags which are inserted when the mobile position determining command is received. To this end, the processor CPU of the base station BTS2 is provided with a further memory space M2 for storing said one or more flags.

When a mobile position determining order or command is identified, the modified base station BTS2 can commence the same program loop as with a typical handover in order to perform the same measurement of access bursts obtained from the mobile station MS as in a standard handover. Distinct from a standard handover, however, the base station BTS2 shall inhibit confirmation of the received access burst by inserting a flag in the memory space of the central processor.

As an alternative to commencing the procedure applied in a typical handover, a separate program loop may be used for determining the position of the mobile. It is necessary in this case to provide the control part of the base station with memory space (not shown) in which the loop specific to the position determining process can be stored.

All of the base stations, BTS2–BTS3 in FIG. 1, that are to determine the position of a mobile in accordance with the invention must be modified in the same way as the base station BTS2. The original serving base station BTS1, however, need not be modified, although no harm would result by doing so.

An ordinary radio base transceiver station in the GSM-system can serve mobile stations at a maximum distance of thirty-five km. The GSM-system also specifies a radio base transceiver station configured to serve mobile stations on an extended distance of a maximum of seventy km.

U.S. Patent Application Ser. No. 08/617,406 teaches implementation of handover when distances between the mobile station and the radio base transceiver station are more than thirty-five km. The teaching of U.S. Patent Application Ser. No. 08/617,406 is also applicable for the present invention when handover is performed for the purpose of determining the position of the mobile station and the distance is more then thirty-five km between the mobile station and the radio base transceiver station.

It will be understood that the invention is not restricted to the aforedescribed and illustrated exemplifying embodiments thereof including only one base station controller and one mobile switching center, and that the invention can be applied with several base station controllers and mobile switching centers as encompassed within the scope and spirit of the following claims.

Furthermore, although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method of determining the position of a mobile station in a TDMA-type mobile radio system, which includes at least one base station controller with associated radio base transceiver stations and at least one mobile radio switching center, wherein while connected to a given first base station the mobile station continuously evaluates the radio connections from a first plurality of base stations, and wherein said first plurality of base stations are placed in ranking order and inserted in a ranking list, the method comprising the steps of:
   a) designating a second plurality of base stations from said first plurality of base stations from said list;
   b) ordering the mobile station to handover to a designated second base station among said second plurality of base stations;
   c) initiating a handover from the mobile station to said designated second base station by sending an access signal to said designated second base station;
   d) in the same way as with handover, at said designated second base station,
      measuring and recording a first time delay upon the arrival of the access signal relative to the arrival time expected at said designated second base station if the mobile station were located in the same place as said designated second base station;
   e) inhibiting confirmation of the access signal received from the mobile station by said designated second base station;
   f) evaluating the recorded first time delay; and
   g) repeating the commands and measuring procedures according to steps b)–f) in at least one additional base station selected from said second plurality of base stations; and
   wherein after there is obtained at least one additional time delay, the recorded first time delay along with the at least one additional time delay can be used to calculate the position of the mobile station.

2. A method according to claim 1, further comprising the step of:
   carrying out steps b)–f) in at least one base station selected from said second plurality of base stations in a); and
   wherein the time delay obtained from said at least one base station is used together with another time delay measured by an earlier known method in said given first base station to determine the position of the mobile station.

3. A method according to claim 2, wherein:
at least three time delays are obtained for the purpose of calculating the position of the mobile station.

4. A method according to claim 2, wherein:
the mobile radio system is a GSM-system.

5. A method according to claim 1, wherein:
at least three time delays are obtained for the purpose of calculating the position of the mobile station.

6. A method according to claim 1, wherein:
the mobile radio system is a GSM-system.

7. A method according to claim 1, further comprising the step of:
   during an established connection with said given first base station,
      measuring, by the mobile station, a time reference for each of the base stations of said first plurality of base stations recorded in said list, said time reference and an order number of a designated time slot determining a point in time at which the access signal is sent from the mobile station to said designated second base station.

8. A method according to claim 1, further comprising the step of:

in said designated second base station, receiving a mobile position determining command which includes a modified version of the channel activity command, whereupon said designated second base station inhibits confirmation of the receipt of the access signal from the mobile station.

9. A modified radio base transceiver station, which effects measuring and registration of an access signal arrival time in the same manner as with typical handover so as to enable the position of a mobile station that has sent the access signal in a mobile radio system of the TDMA-type to be calculated, said mobile radio system including at least one base station controller with associated radio base transceiver stations and at least one mobile radio switching center, wherein during an established connection with a given first base transceiver station said mobile station continuously evaluates the radio connections from a plurality of base transceiver stations, and wherein said plurality of base transceiver stations are placed in ranking order in a list, said modified radio base transceiver station comprising:

a memory space in which there is stored a mobile position determining command;

means for comparing said mobile position determining command with commands received from said at least one base station controller to thereby identify a command concerning the determination of the position of said mobile station;

means for inhibiting confirmation of an access signal obtained from said mobile station if said command concerning the determination of the position of said mobile station is identified;

a further memory space capable of storing a flag; and wherein the flag is enabled when the mobile position determining command is received from the base station controller; and wherein the flag is checked during the handover procedure so as to inhibit confirmation of the access signal received from the mobile station in the event of the flag being enabled.

10. A modified radio base transceiver station according to claim 9, wherein:

said radio base transceiver station comports with the GSM-system specification.

11. A modified radio base transceiver station, which effects measuring and registration of an access signal arrival time in the same manner as with typical handover so as to enable the position of a mobile station that has sent the access signal in a mobile radio system of the TDMA-type to be calculated, said mobile radio system including at least one base station controller with associated radio base transceiver stations and at least one mobile radio switching center, wherein during an established connection with a given first base transceiver station said mobile station continuously evaluates the radio connections from a plurality of base transceiver stations, and wherein said plurality of base transceiver stations are placed in ranking order in a list, said modified radio base transceiver station comprising:

a memory space in which there is stored a mobile position determining command;

means for comparing said mobile position determining command with commands received from said at least one base station controller to thereby identify a command concerning the determination of the position of said mobile station;

means for inhibiting confirmation of an access signal obtained from said mobile station if said command concerning the determination of the position of said mobile station is identified;

a further memory space in which a program loop is stored; and wherein the program loop is executed when a mobile position determining command is received from the base station controller; and wherein the station measures the access signal received from the mobile station in manner typical with handover, but inhibits confirmation of said receipt to the mobile station.

12. A modified radio base transceiver station according to claim 11, wherein:

said radio base transceiver station comports with the GSM-system specification.

13. An electronically-executable command or program in a computer-accessible memory or on a computer-readable medium, said command or program adapted for interacting with a radio communications system, said command or program comprising:

means for participating in the initiation of a handover process;

means for ascertaining a propagation delay with respect to a transmission from an element of the radio communications system, said element participating in the initiation of said handover process; and means for intentionally failing to complete said handover process.

14. An electronically-executable command or program according to claim 13, further comprising:

means for receiving and interpreting a mobile position determining command.

15. A base transceiver station in a radio communications system, said base transceiver station adapted for interacting with a mobile station to participate in a geographical location determination, said base transceiver station comprising:

means for beginning a handover process;

means for ascertaining a propagation delay; and means for terminating said handover process by failing to respond to an access signal from said mobile station.

16. An electronically-executable command or program according to claim 15, further comprising:

means for receiving and interpreting a mobile position determining command.

17. A method in a base transceiver station in a radio communications system, said base transceiver station adapted for interacting with a mobile station to participate in a geographical location determination, the method comprising the steps of:

beginning a handover process;

ascertaining a propagation delay; and terminating said handover process by failing to respond to an access signal from said mobile station.

18. A base transceiver station according to claim 17, further comprising:

means for receiving and properly interpreting a mobile position determining command.

* * * * *

UNITED STATES PATENT AND TRADEMARK OFFICE
CERTIFICATE OF CORRECTION

PATENT NO.   : 6,122,512
DATED        : September 19, 2000
INVENTOR(S)  : Roland Bodin It is certified that error appears in the above-identified patent and that said Letters Patent is hereby corrected as shown below:

Column 7,
Line 64, replace "BS" with -- B5 --

Column 8,
Line 38, replace "Al" with -- A1 --

Column 14, claim 16,
Line 48, replace "An electronically-
executable command or program"
With -- A base transceiver station --

Column 14, claim 18,
Lines 62 and 63, replace "A base transceiver
station according to Claim 17,
further comprising:"
With -- A method in a base
transceiver station according
to Claim 17, the method further
comprising the step of: --
Line 64, delete "means for"

Signed and Sealed this

Fifth Day of February, 2002

Attest:

JAMES E. ROGAN
Attesting Officer   Director of the United States Patent and Trademark Office